United States Patent [19]

Koen et al.

[11] Patent Number: 4,993,265
[45] Date of Patent: Feb. 19, 1991

[54] PROTECTED PRESSURE SENSOR AND METHOD OF MAKING

[75] Inventors: Edward F. Koen, Pleasanton; Richard Tasker, San Jose, both of Calif.

[73] Assignee: The Foxboro Company, Foxboro, Mass.

[21] Appl. No.: 362,113

[22] Filed: Jun. 5, 1989

Related U.S. Application Data

[63] Continuation of Ser. No. 163,598, Mar. 3, 1988, abandoned.

[51] Int. Cl.⁵ .......................... G01L 7/00; H01R 43/00
[52] U.S. Cl. .......................................... 73/706; 29/593; 29/856; 73/723; 73/754; 73/756; 361/283
[58] Field of Search .................... 29/593, 856; 73/717, 73/706, 723, 754, 756; 361/283

[56] References Cited

U.S. PATENT DOCUMENTS

| | | |
|---|---|---|
| 4,567,006 | 1/1986 | Covington et al. |
| 4,655,088 | 4/1987 | Adams . |
| 4,691,573 | 9/1987 | Varnum et al |
| 4,732,042 | 3/1988 | Adams |

Primary Examiner—Howard N. Goldberg
Assistant Examiner—Carl J. Arbes
Attorney, Agent, or Firm—Terrence Martin; Jules Jay Morris; Michael L. Sheldon

[57] ABSTRACT

A solid state measurand sensor is described in which the pressure sensor element is protected from the measurand by a combination of a pressure transfer medium and a thin covering membrane. A method is described for forming the diaphragm in situ. The diaphragm material is selected from a group of materials which includes fluorosilicone, so as to substantially avoid entrapment of air or formation of voids in the pressure transfer medium such as would degrade the performance of the sensor. The pressure transfer medium is gel-like material such as dimethyl silicone and equivalents. Alternatively, the gel may be fluorosilicone and the diaphragm may be dimethyl silicone. The membrane material is chosen to be substantially impermeable to the ambients or process media being measured and also flexible, is to be poured and cured in place on the assembly during fabrication.

34 Claims, 3 Drawing Sheets

*— PRIOR ART —*

*— PRIOR ART —*

PROTECTED PRESSURE SENSOR AND METHOD OF MAKING

This is a continuation of co-pending application Ser. No. 07/163,598, filed on 03/03/88, now abandoned.

BACKGROUND OF THE INVENTION

1. Technical Field

This invention relates generally to solid state pressure sensors and more particularly, to means and methods for protecting a pressure sensor element from the process media whose pressure is being sensed.

2. Background Art

Solid state pressure sensors are being employed in a variety of new applications because of their small size and compatibility with other electronic systems. Semiconductor chips or dice are frequently used as the pressure sensing elements. However, such semiconductor sensing elements are particularly sensitive to contamination. Thus, if the surface of the semiconductor sensing element is exposed directly to the process media whose pressure is being measured, the semiconductor sensing element may be adversely affected. The gel generally must remain insulative; contamination may render it conductive.

A number of different approaches have been used in the prior art in order to isolate the semiconductor sensing element from the process media being measured. Among these are, for example, the use of die coats and the use of metal diaphragms coupled to the semiconductor sensing element by rigid bars or levers. None of these approaches has proven entirely satisfactory. Accordingly, a need continues to exist for improved means and methods for protecting semiconductor pressure sensing elements from the process media whose pressure is being measured.

Another method includes providing a gel-like pressure transfer medium between the pressure sensing element and a prefabricated fluorosilicone diaphragm, such as is disclosed in U.S. Pat. No. 4,686,764.

The '764 method cannot provide highly reliable production of diaphragms which are flush with the face surface of the sensor body. The '764 method does not provide reliable initial pressurization sensitivity in sensors. The '764 method provides sensors the sensitivity of which may vary over time. The '764 method is time consuming and costly to make, and unreliable compared with the present invention. In contrast, the present invention is also economical, easy to manufacture, and lends itself to automated manufacture.

Accordingly, it is an object of the present invention to provide an improved means and method for protecting a semiconductor pressure sensing element from the process media whose pressure is being measured.

It is a further object of the present invention to provide an improved means and method whereby the semiconductor sensing element is protected from the process media without substantial loss in sensitivity.

It is an additional object of the present invention to provide an improved means and method for protecting a semiconductor pressure sensing element from the process media without the use of metal diaphragms with rods or levers.

It is a further object of the present invention to provide an improved means and method for protecting a semiconductor pressure sensing element which is of light weight and is an extremely shock resistant assembly.

Another object of the invention is improved product fabrication, product quality, and cost savings.

Yet another object of the invention is increased sensor accuracy due to a diaphragm having a low spring rate and a diaphragm which does not induce pressure on the sensor in connection with minimal volume gel fill.

It is an object of the present invention to enable very small diaphragm areas (by use of low modulus "rubber") which permits small (TO-8) sensor packaging.

Yet another object of the present invention is to provide sensors suitable for medical applications by the use of medical grade diaphragm materials.

Another object of the invention is reduced thermal error due to a diaphragm having a low spring rate and a diaphragm which does not induce pressure on the sensor element, in connection with minimal volume gel fill.

A significant manufacturing, quality, and performance advantage inheres in the method of fabrication, in that before the pressure transfer medium and the diaphragm are added to the sensor, the mounted sensor element or die may be tested and laser trimmed to the desired calibration. The initial flowable state of the pressure transfer medium and the diaphragm material allows the diaphragm to be applied in a zero stress state without inducing any force on the sensor. Significantly higher yields of tighter specification products result at lower cost.

Another advantage of the present invention is the ability of the pour-in-place diaphragm procedure to smoothly cover irregularities in the pressure transfer medium without creating air bubbles or pockets which could adversely affect performance.

Other advantages of the invention include: small size, sensors having compliant diaphragms which have a low spring rate; manufacturing ease; resistance to a broad spectrum of process media; low cost; enables sensing pressure applied by solid and/or semi-solid contact, not just gas or liquid; and the product design lends itself to inert plastic packaging.

SUMMARY OF THE INVENTION

Attainment of the foregoing and other objects and advantages is achieved through the present invention wherein there is provided a dielectric body containing a cavity, wherein said cavity has a first interior surface for receiving a pressure sensor element and a second generally upward facing surface for supporting the diaphragm; mounting said pressure sensor element on said first surface; filling at least part of said cavity around said pressure sensor element with a volume of a pressure transfer material less than the volume of said cavity around said sensor element below said opening; pouring a flexible poured-in-place diaphragm intended for sealing said opening by adding a volume of diaphragm material above said pressure transfer material; curing said pressure transfer material and said poured in place diaphragm material.

The pressure transfer medium may be a liquid or a gel-like material or soft elastic solid. The poured-in-place diaphragm means must be flexible yet strong in order to respond to variations in external pressure and to transfer the external pressure through the pressure transfer medium to the sensing element reliably.

This invention relies on a very small, low-volume header including an upwardly-facing surface area for supporting a diaphragm, and the use of two materials to isolate the sensor element, a small volume of gel material and a diaphragm material wherein both materials are fluid at the time of application. The two materials are preferably both chemically inert and are of mutual chemical incompatibility.

The details of the present invention will be more completely understood in terms of the drawings and description which follow.

DETAILED DESCRIPTION OF THE PREFERRED EMBODIMENTS

For purposes of explanation, the sensor assemblies and structures described herein are illustrated for a semiconductor solid state sensing element and more particularly, solid state sensing elements having a region for sensing a measurand to be measured on a first surface thereof. Certain sensor devices may also require a region for sensing a reference measurand on a second surface, which may be opposite the first surface. However, those of skill in the art will understand that other sensor configurations may equally well be used. The measurands may be selected from the known measurands; the present example being directed to a pressure or force measurand, without intended limitation thereto.

Figure 1:
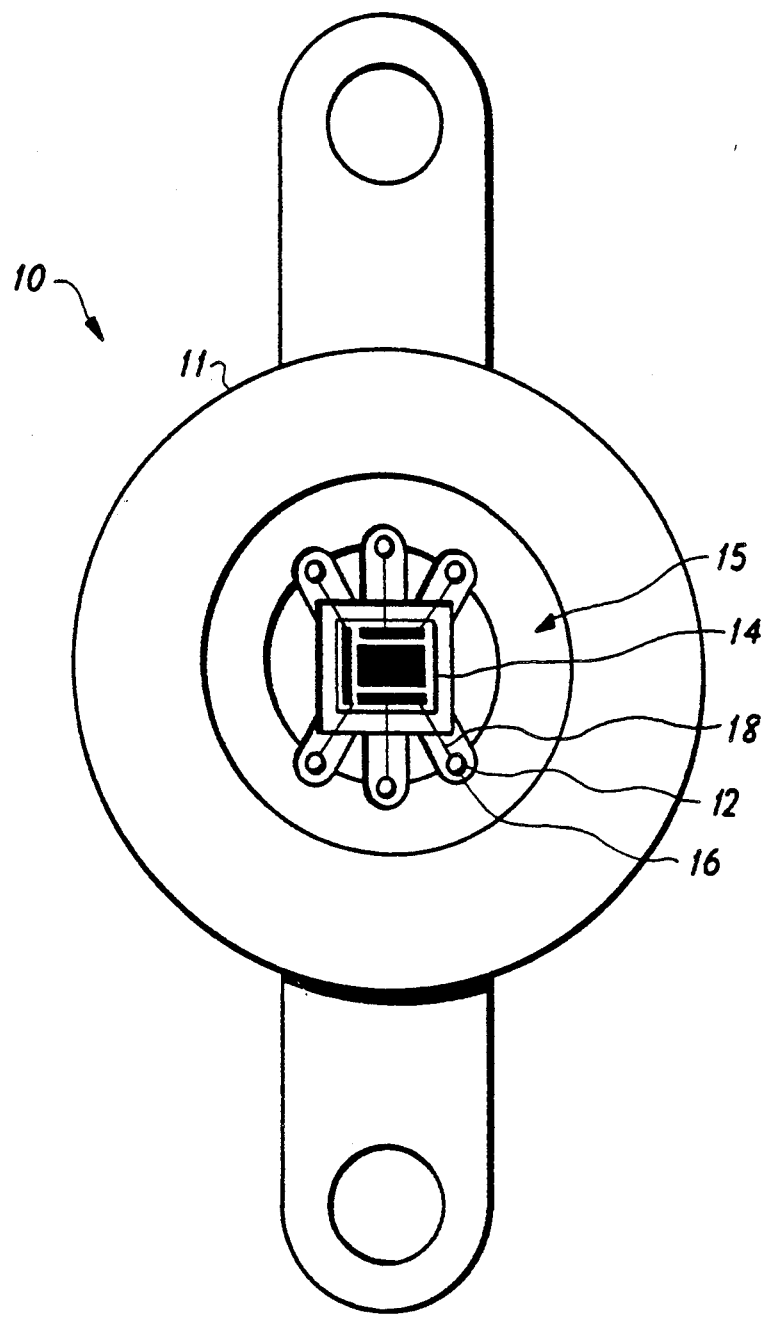
FIG. 1 shows in simplified schematic form a plan view of a solid state semiconductor pressure sensor according to the present invention.
Figure 4:
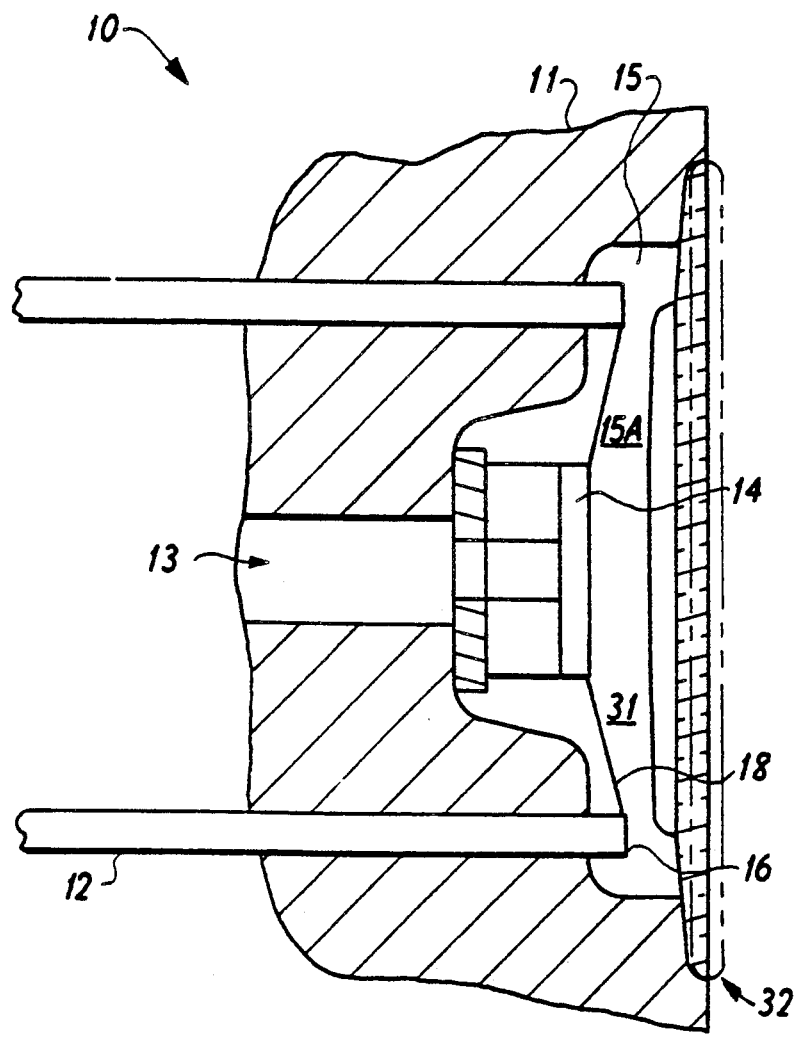
FIG. 4 shows in simplified form a cross-section of portions of a solid-state pressure sensor according to the present invention.

FIG. 1 shows in simplified schematic form a solid state pressure sensor, FIG. 4 shows a cross-section of the sensor of FIG. 1. In FIGS. 1 and 4, pressure sensor 10 comprises header or body 11 having internal cavity 15 in which is mounted semiconductor solid state sensing element 14, which may be a chip or die. Electrical leads 12 extend from outside of body 11 through the wall of body 11 into cavity 15. Signal communication by non-electrical, e.g., optical, means may also be provided. Sensing element 14 is mounted inside cavity 15 of body 11 by known means above aperture or hole 13. This mounting means may include, for example, an adhesive. A reference pressure receiving portion of sensing element 14 is aligned over aperture 13. Areas on sensing element 14 are electrically connected by conductors 18 to leads 12, typically by wirebonds 16. Body 11 may be conveniently formed of separate parts or from a single unit. Body 11 is conveniently a dielectric material, preferably plastic, for example, polyphenylene (Noryl), or polyphenylene sulfide (e.g., Ryton R-4). Other materials may be used provided leads 12 are insulated from each other and, preferably, from body 11, and are suitably sealed.

Figure 2:
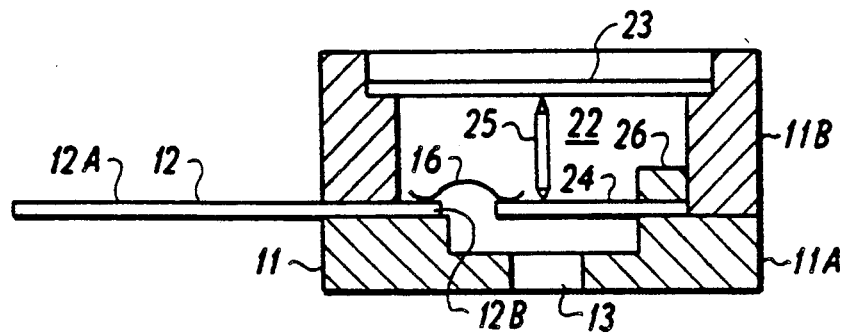
FIG. 2 shows in simplified schematic form a cross-section through a semiconductor solid state pressure sensor employing a preformed metallic diaphragm, according to other prior art.

A method which is allegedly an improvement and which has been used in the prior art is illustrated in FIG. 2. FIG. 2 is a cross-section through a solid state pressure sensing element comprising a body 11 having upper and lower parts 11a and 11b, leads 12 having external portions 12a and internal portions 12b, and a bar shaped semiconductor sensing element 24 which is attached at one end to body 11 by clamp means 26 and connected to leads 12 via wirebonds 16. A prefabricated metal diaphragm 23 separates cavity 22 containing sensing element 24 from the external process media having a pressure measurand to be measured. Hole 13 allows a reference pressure to be communicated to cavity 22 when such is desired. Rigid bar or rod 25 provides mechanical coupling between the center of a prefabricated metal diaphragm 23 and semiconductor sensing element 24.

While the configuration of FIG. 2 protects sensing element 24 from the process media whose pressure is intended to be measured, the arrangement of FIG. 2 is expensive to manufacture because of the small piece parts which must be individually handled and precisely located within body 11, and it is also comparatively fragile. It is well known, for example, that semiconductor pressure sensing elements may be extremely brittle. In order to have high sensitivity in the arrangement of FIG. 2, cantilever bar shaped element 24 must be directly coupled via rod 25 to diaphragm 23. Over-pressure conditions applied to diaphragm 23 can readily cause catastrophic failure of sensing element 24. A further disadvantage of the structure of FIG. 2 is that the sensitivity and calibration of the sensor depend critically upon the placement of bar 25 on sensing element 24 and diaphragm 23. A further problem with the arrangement of FIG. 2 is that the active regions of sensing element 24 are exposed to the reference ambient entering via hole 13.

Figure 3:
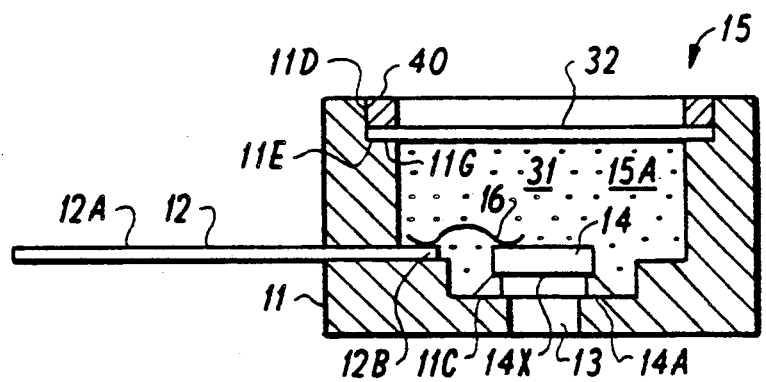
FIG. 3 shows in simplified schematic form a cross-section of the prior art pressure sensor of U.S. Pat. 4,686,764 employing a preformed fluorosilicone diaphragm.

As shown in FIG. 3, the prior art solid state sensor according to U.S. Pat. No. 4,686,764 comprises body 11 having leads 12 with external portions 12a and internal portions 12b. Semiconductor sensing element 14 having reference pressure receiving region 14x is mounted by means 14a on surface 11c in cavity 15 of body 11 over hole 13. Wirebonds 16 are used for coupling the active regions of sensor 14 to leads 12. The upper surface of sensor element 14 may be covered with conventional die coat (not shown). However, this is not essential and the die coat may be omitted. Body 11 conveniently extends to the open end of cavity 15 containing sensing element 14. Sensing element 14 may be sealed to surface 11c by any convenient means 14a well known in the art. Organic adhesives are a suitable sealing means. The reference pressure entering via hole 13 acts only on portion 14x of sensor 14 and does not enter cavity 15.

Once die 14 has been mounted in cavity 15 of body 11, '764 teaches that the lower portion 15a of cavity 15 is to be filled with pressure transfer medium 31. An example of a suitable material is given in the reference as Visilox type 191 silastic manufactured by the Visilox Company of Troy, NY. In order to make the transfer medium material opaque to light, approximately 40 percent by volume of titanium dioxide may be mixed into the Visilox 191 material prior to its being introduced into cavity 15, but this is not essential when the preformed diaphragm is opaque. It is stated to be important that upper surface of material 31 extends at least above lip 11e.

After being placed into portion 15a of cavity 15, the Visilox 191 material is to be vacuum cured.

It is necessary to cover pressure transfer medium 31 with a prefabricated protective membrane 32 (FIG. 3).

Membrane 32 must be flexible and substantially impermeable to the process media of interest even after curing.

It is stated to be important that membrane or diaphragm 32 be applied to pressure transfer material 31 in such a way that substantially no air pockets or other voids are trapped within medium 31. This is very difficult to accomplish. If significant voids or pockets are present, the sensitivity and linearity of the pressure transducer will be adversely affected. Substantially void-free application of membrane 32 may allegedly be accomplished as illustrated in FIG. 3, in which a first portion of membrane 32 is placed in contact with a portion of shelf or lip 11e where the transfer medium meets shelf 11e. Prefabricated membrane 32 is then rolled across opening 15 away from the starting location to enclose the cavity 15. It is stated that in the process of rolling out diaphragm 32 it is necessary to push ahead of the unrolling diaphragm a "bow-wave" of material 31 which allegedly fills in any exposed empty places or voids within cavity portion 15.

The rolling and squeezing motion of diaphragm 32 is to be continued until all the voids are filled by material 31, with excess material to be removed. In practice, this is difficult to achieve reliably. The reference teaches that membrane 32 may be of any convenient flexible impermeable material. Fluorosilicone is cited as an example of a suitable material for membrane 32.

The prior art disadvantages may be overcome by the means and method of the present invention which are illustrated in FIG. 4, which shows a simplified schematic cross-sectional view of a solid state measurand sensor, similar to FIG. 2, but made according to the present invention.

As shown in FIG. 4, solid state sensor 10 comprises body 11 having leads 12 with portions external to the body 11 and other portions extending into the cavity 15 of the body 11. Semiconductor sensing element 14 having a reference pressure receiving region is mounted by known means on an exposed surface in cavity 15 of body 11 over hole 13. Wires 18 are used for coupling the active regions of sensor 14 to leads 12 where they are conventionally bonded. The upper surface of sensor element 14 may be covered with conventional die coat (not shown). However, this is not essential and the die coat may be omitted. Body 11 conveniently extends to the open end of cavity 15 containing sensing element 14. Sensing element 14 may be sealed to the exposed surface by any convenient means known in the art, including organic adhesives. The reference pressure entering via aperture 13 acts only on a portion of sensor 14 and does not enter cavity 15.

Once die 14 has been mounted in cavity 15 of body 11, then lower portion 15a of cavity 15 is at least partially filled with a pressure transfer medium 31. It is important that during filling of lower portion 15a of cavity 15 with material 31 that trapped gas pockets or enclosed voids be avoided as much as possible. This is conveniently accomplished by using a material for pressure transfer medium 31 which has a low viscosity at the time of introduction. It need not fully cure. A measured amount of material 31 is deposited on and/or around die 14 within the header or body 11 cavity 15 to flow into and fill lower portion 15a of cavity 15. It is important that upper surface of material 31 extend at least above the die 14.

Medium 31 may be of any convenient material which does not contaminate sensor element 14, which remains in a liquid or at least gel-like or elastic form after introduction and curing of subsequent layers. If a material is used which sets up or becomes hard, then the measurand signal which will subsequently be applied to diaphragm 32 will be attenuated or skewed with temperature excursions before reaching sensor element 14 and the finished device 10 will be insensitive or inaccurate. The gel may be evacuated to reduce voids.

More elastic materials, even liquids, can also be used. If the material 31 is at least partially cured after being introduced into cavity 15, then the needed elasticities apply after curing. An example of a suitable material is flourosilicone dielectric gel, such as Dow-Corning part number X3-6679.

These materials are initially in a liquid or semi-liquid state and upon curing set up to the consistency of a very soft rubber-like material or gel.

It may be desirable that radiant (light) energy should be excluded from reaching the sensor element. If it is desired to test, laser trim, and/or calibrate the sensor element, such procedures should be completed before covering the sensor die. An opaque diaphragm material may be used as a light blocker, or the transfer medium may be opaque. In order to make the transfer medium material opaque to light, a portion of titanium dioxide or equivalent may be mixed into the pressure transfer material prior to its being introduced into cavity 15, but this is not essential when the diaphragm is opaque. After being placed into portion 15a of cavity 15, the material 31 may be cured following the manufacturer's recommendations. Those of skill in the art will know the appropriate materials curing cycles.

Some materials may shrink slightly on curing. Another method is to provide an initial fill of material 31 approximately to the level of cure the initial fill, as described above, and then prior to pouring membrane 32, a small amount of the material 31 or other liquid is added to bring the level back up to or slightly above the desired level for material 31.

The presence of poured-in-place membrane 32 has been found to be useful in preventing undesirable external materials from reaching sensor element 14.

According to the present invention, it is desired to cover pressure transfer medium 31 with pour-in-place membrane 32 such as is shown in FIG. 4. The pressure transfer material provides support for the diaphragm. Pourable membrane 32 must be flexible and substantially impermeable to the process media of interest, even after curing. The substitution of a poured-in-place diaphragm for a prefabricated diaphragm is an important variation from the prior art processes for making sensors.

It is preferred that membrane or diaphragm 32 be deposited on the transfer material 31 in such a way that substantially no air pockets or other voids are trapped within medium 31. With significant voids or pockets present, the sensitivity and linearity of the pressure transducer will be adversely affected. Substantially void-free application of membrane 32 may be conveniently accomplished by the method illustrated in FIG. 4, in which a pourable, viscous membrane 32 material is poured in contact with the transfer medium, filling in any exposed empty places or voids within cavity portion 15a, e.g., such as are illustrated at location 15v in FIG. 4. Evacuating may be used to ensure voids are eliminated. Different viscosity materials may eliminate void reducing steps. Note that it may be desirable for formed-in-place membrane 32 to extend above the face surface of the header in some applications, may be level in others, or may be insufficient to extend beyond the header surface in others. These variations are difficult or impossible with the prior art methods.

Materials such as Dow-Corning X3-6679 alone, while having desirable properties as a pressure transfer medium, are sufficiently permeable to many process media so as to provide insufficient protection. Incomplete curing may leave a portion of the material in a liquid state. The membrane 32 solves these problems. Membrane 32 may be of any suitable and convenient flexible impermeable material which is conveniently pourable. Fluorosilicone is an example of a suitable material for membrane 32. Medical grade RTV type materials permit contact with bodily fluids in medical applications. It is important that membrane 32 be flexible after curing since if it is stiff, the pressure signal will be attenuated prior to reaching sensor element 14. Curing should be complete and not continue after manufacture and installation. Thicknesses for membrane 32 in the range 0.001 to 0.10 may be useful, 0.01 to 0.10 inches are more useful, with 0.02 to 0.05 inches being preferred.

Pressure sensors according to the present invention were constructed wherein body 11 was circular and in which the initial aperture for cavity 15 had a minor diameter of approximately 0.22 inches, and the chip or die 14 had a mounting area diameter of approximately 0.15 inches. A fluorosilicone diaphragm having an outer diameter corresponding approximately to the size of the body face opening (i.e., the cavity major diameter) was poured in place over pressure transfer medium 31 as described above. In one case the major diameter was about 0.48 inches. It was determined that the sensitivity of the resulting unit was substantially the same with and without membrane 32. There was no hysteresis. The fluorosilicone used was X3-6679 type material, manufactured by Dow-Corning of Midland, Mich. This fluorosilicone material is particularly soft and flexible. If a harder or denser membrane material is desired to be used, then the thickness of the membrane should be correspondingly reduced in order to maintain about the same sensitivity. It is desirable that the thickness of different membrane materials be adjusted approximately inversely proportional to their relative hardness; this being dependent on the intended application and being within the skill of one of ordinary skill within the art.

It will be appreciated by those of ordinary skill in the art, that different membrane materials which are particularly impermeable to certain ambients may be used to cover sensors intended for such ambients.

It will also be appreciated by those of skill in the art, that the above-described structure and method of fabrication provide a particularly conveniently manufactured membrane protected pressure sensor. No complex mechanical linkages, as were used for example in the structure of FIG. 2 are required. No complicated, difficult "rolling-in-place" diaphragm positioning and/or attaching procedures are required. The finished device as illustrated in FIG. 4 is particularly rugged, is flat, and uses a minimum number of piece parts. Further, no complex physical assembly steps are required for coupling the membrane to the sensing element. The product according to the present invention lends itself to automated assembly and manufacture. Additionally, the device is not readily damaged by over-pressure conditions since the active portion of the solid state sensor element is uniformly supported by attachment means surrounding hole 13.

The pressure transfer medium (gel) and the poured-in-place diaphragm are of dissimilar materials, preferably both chemically inert and/or mutually incompatible. For example, use of a dimethyl silicone gel is preferred with a flourosilicone diaphragm, and a flourosilicone gel is preferred with a dimethyl silicone diaphragm material. Dimethyl silicone gels in combination with dimethyl silicone diaphragms (and flourosilicone/flourosilicone) should be avoided, absent some means to prevent chemical interaction between the gel and diaphragm. Skilled artisans in this field will recognize that each diaphragm material has beneficial uses.

Those of skill in the art will understand that a variety of different sensing elements may be used in connection with the means and methods of the present invention, and further that a wide variety of pressure transfer materials may be employed provided they are sufficiently liquid to be applied substantially void-free in filling cavity portion 15a, and sufficiently elastic after introduction (and curing) to transmit the pressure applied to membrane 32 to sensor 14 without significant attenuation or hysteresis. Those of skill in the art will also understand that a variety of membrane materials may be used provided they are substantially impermeable to the ambient or process media whose pressures are intended to be measured and sufficiently flexible to be applied by the methods described herein and to avoid attenuation of the pressure signal. Accordingly, the appended claims are intended to include all such reasonable variations in materials.

What is claimed is:

1. A method of forming a pressure sensor environmentally protected by a diaphragm, comprising:
   providing a body having in a first face thereof a cavity, wherein said cavity has a first interior surface for receiving a pressure sensor element and a second generally upward facing surface for supporting the diaphragm;
   mounting said pressure sensor on said first surface;
   filling at least part of said cavity around said pressure sensor element with a volume of a pressure transfer material less than the volume of said cavity around said sensor element below said body face; and
   pouring a volume of a flexible, pourable-in-place diaphragm material above said pressure transfer material sufficient to seal said cavity, wherein said diaphragm material and said pressure transfer material are chemically incompatible.

2. The method of claim 1 wherein said diaphragm is formed adjacent to said second surface in the absence of substantial diaphragm material shrinkage.

3. The method of claim 1 wherein said step of pouring the flexible, poured-in-place diaphragm comprises providing a diaphragm poured from a flowable polymeric material.

4. The method of claim 2 wherein the step of pouring the flexible diaphragm material comprises providing a diaphragm poured from a fluorosilicone material which substantially retains its original volume upon setting.

5. The method of claim 2 wherein the step of pouring the flexible diaphragm material comprises providing a diaphragm poured from a dimethyl silicone material which substantially retains its original volume upon setting.

6. The method of claim 2 wherein the step of pouring the flexible diaphragm material comprises providing a diaphragm poured from a medical grade silicone "rubber" material which substantially retains its original volume upon setting.

7. The method of claim 1 further including the step of testing the pressure sensor element before filling the cavity.

8. The method of claim 7 further including the steps of adjusting the sensor element and calibrating the pressure element before sealing the cavity.

9. A method of forming a sealed pressure sensor, comprising:
providing a body having in a face surface thereof a first recess of given cross section, bottomed peripherally by a first upward facing surface for supporting a diaphragm, and a second recess from said first recess, said second recess being of smaller cross section than said first recess and being substantially bottomed by a second upward facing surface for supporting a pressure sensing element, wherein said first recess and said second recess form a unitary stepped cavity in said body face surface;
mounting said pressure sensing element on said second surface;
making electrical connections to said pressure sensing element;
substantially filling said second recess below the face portion with a non-gaseous pressure transfer medium;
pouring a flexible diaphragm in contact with said pressure transfer medium and said first surface, wherein said diaphragm material does not shrink upon curing thereof.

10. A measurand sensor produced by the method comprising the steps of:
providing a body having in a first face thereof a cavity, wherein said cavity has a first interior surface for receiving a pressure sensor element and a second generally upward facing surface for supporting a diaphragm;
mounting said pressure sensor on said first surface;
filling at least part of said cavity around said pressure sensor element with a volume of pressure transfer material less than the volume of said cavity around said sensor element below said body face; and
pouring a volume of flexible, pourable-in-place diaphragm material above said pressure transfer material sufficient to seal said cavity,
wherein said first surface is substantially level with the first face, wherein said diaphragm material forms a substantially impermeable barrier having a first, outward facing surface and a second surface facing said pressure transfer material, and wherein said diaphragm material and said pressure transfer material are chemically incompatible and characterized by the absence of chemical interaction between the pressure transfer material and the diaphragm.

11. The sensor of claim 10 wherein said outward facing surface is level with the body first face within 5 mils.

12. The sensor of claim 10 wherein said outward facing surface is level with the body first face within 3 mils.

13. The sensor of claim 10 wherein said outward facing surface is level with the body first face within 1 mil.

14. A measurand sensor produced by the method comprising the steps of:
providing a body having in a first face surface thereof a first recess of given cross section, bottomed peripherally by a first upward facing surface for supporting a diaphragm, and a second recess spaced from said first recess, said second recess being of smaller cross section than said first recess and being substantially bottomed by a second upward facing surface for supporting a pressure sensing element, wherein said first recess and said second recess form a unitary stepped cavity in said body face surface;
mounting said pressure sensing element on said second surface;
making electrical connections to said pressure sensing element;
substantially filling said second recess below the face portion with a non-gaseous pressure transfer medium; and
pouring a flexible diaphragm in contact with said pressure transfer medium and said first surface,
wherein said first surface is substantially level with the first face, wherein said diaphragm material forms a substantially impermeable barrier having a first, outward facing surface and a second surface facing said pressure transfer material, and wherein said diaphragm material does not shrink upon curing thereof and characterized by the absence of chemical interaction between the pressure transfer material and the diaphragm.

15. The sensor of claim 14 wherein said outward facing surface is level with the body first face within 5 mils.

16. The sensor of claim 14 wherein said outward facing surface is level with the body first face within 3 mils.

17. The sensor of claim 14 wherein said outward facing surface is level with the body first face within 1 mil.

18. The measurand sensor, comprising:
a) a body having in a first face surface thereof a first recess of given cross section, bottomed peripherally by means for supporting a diaphragm comprising a first upward facing surface, and a second recess displaced from said first recess, said second recess being of smaller cross section than said first recess and being substantially bottomed by a second upward facing surface for supporting a pressure sensing element, wherein said first recess and said second recess form a unitary stepped cavity in said body face surface,
b) signal communicating electrical pathways into said cavity,
c) a sensing element connected to the communicating pathways, and
d) a non-hardening flexible diaphragm which is pourable in place,
e) means for i) isolating said sensing element from said measurand, ii) for transferring said measurand to said element, and iii) for supporting said diaphragm, comprising a non-hardening pressure transfer medium,
wherein the pressure transfer medium and the diaphragm material are both unbonded and chemically incompatible, and said pressure transfer medium and said diaphragm material are capable of transferring said measurand to said sensing element.

19. The sensor of claim 18, wherein the diaphragm is fluorosilicone based material.

20. The sensor of claim 18, wherein the diaphragm is dimethyl silicone based material.

21. The sensor of claim 18, further including means for transferring a second measurand to the sensing element.

22. The sensor of claim 18, wherein the sensing element comprises a solid state sensor element.

23. The sensor of claim 18 wherein said first recess is of a lesser volume than said second cavity.

24. The sensor of claim 18 wherein the volume of said first recess substantially includes the diaphragm material.

25. The sensor of claim 18 wherein said diaphragm forms a substantially impermeable barrier having an outward facing surface and an inward facing surface facing and supported by said pressure transfer medium at its center and by said first upward facing surface at its periphery.

26. The sensor of claim 25 wherein said outward facing surface is recessed below the body first face.

27. The sensor of claim 25 wherein said outward facing surface is substantially level with the body first face.

28. The sensor of claim 25 wherein said outward facing surface is level with the body first face within 5 mils.

29. The sensor of claim 25 wherein said outward facing surface is level with the body first face within 3 mils.

30. The sensor of claim 25 wherein said outward facing surface is level with the body first face within 1 mil.

31. The sensor of claim 21 wherein said body includes a second face opposite said first face, and said means for communicating a second measurand to the sensing element includes an aperture in said second face and a communicating passageway into said second recess.

32. The sensor of claim 18, wherein the pressure transfer medium is a dimethyl silicone based material.

33. The sensor of claim 18, wherein the pressure transfer medium is a fluorosilicone material.

34. The sensor of claim 18, further including an opaquing agent to isolate the sensing element from light.

* * * * *